(12) United States Patent
Hart et al.

(10) Patent No.: US 8,376,894 B2
(45) Date of Patent: Feb. 19, 2013

(54) MULTI-SPEED TRANSMISSION HAVING THREE PLANETARY GEAR SETS

(75) Inventors: James M. Hart, Belleville, MI (US); James B. Borgerson, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 189 days.

(21) Appl. No.: 12/908,524

(22) Filed: Oct. 20, 2010

(65) Prior Publication Data

US 2011/0136614 A1    Jun. 9, 2011

Related U.S. Application Data

(60) Provisional application No. 61/266,444, filed on Dec. 3, 2009.

(51) Int. Cl.
F16H 3/62 (2006.01)

(52) U.S. Cl. .................................. 475/276; 475/280
(58) Field of Classification Search .................. 475/275, 475/276, 280
See application file for complete search history.

(56) References Cited

U.S. PATENT DOCUMENTS

| | | | | |
|---|---|---|---|---|
| 6,071,208 | A * | 6/2000 | Koivunen | 475/275 |
| 6,679,803 | B1 * | 1/2004 | Raghavan et al. | 475/276 |
| 6,705,967 | B2 * | 3/2004 | Raghavan et al. | 475/275 |
| 6,709,360 | B2 | 3/2004 | Raghavan et al. | |
| 2011/0015029 | A1 * | 1/2011 | Phillips et al. | 475/275 |

* cited by examiner

*Primary Examiner* — Justin Holmes

(57) ABSTRACT

A transmission is provided having an input member, an output member, three planetary gear sets, a plurality of coupling members and a plurality of torque transmitting devices. Each of the planetary gear sets includes first, second and third members. The torque transmitting devices include clutches and brakes.

11 Claims, 5 Drawing Sheets

| GEAR STATE | GEAR RATIO | RATIO STEP | TORQUE TRANSMITTING MECHANISMS | | | | |
|---|---|---|---|---|---|---|---|
| | | | 30 130 230 330 430 530 | 32 132 232 332 432 532 | 34 134 234 334 434 534 | 26 126 226 326 426 526 | 28 128 228 328 428 528 |
| REV | -3.457 | | | X | X | | |
| N | | -1.15 | | | | | |
| 1ST | 3.000 | | | | X | | X |
| 2ND | 1.800 | 1.67 | X | | | | X |
| 3RD | 1.336 | 1.35 | | X | | | X |
| 4TH | 1.000 | 1.34 | | | | X | X |
| 5TH | 0.726 | 1.38 | | X | | X | |
| 6TH | 0.600 | 1.21 | X | | | X | |

X = ON - ENGAGED CARRYING TORQUE

FIG. 9

MULTI-SPEED TRANSMISSION HAVING THREE PLANETARY GEAR SETS

CROSS-REFERENCE TO RELATED APPLICATIONS

This application claims the benefit of U.S. Provisional Application No. 61/266,444, filed on Dec. 3, 2009, which is hereby incorporated in its entirety herein by reference.

FIELD

The invention relates generally to a multiple speed transmission having a plurality of planetary gear sets and a plurality of torque transmitting devices and more particularly to a transmission having six or more speeds, three planetary gear sets and a plurality of torque transmitting devices.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transmission is provided having an input member, an output member, three planetary gear sets, a plurality of coupling members and a plurality of torque transmitting devices.

In one embodiment, the transmission includes an input member, an output member, first, second and third planetary gear sets each having first, second and third members, wherein the input and output members are each interconnected to at least one of the first, second, and third planetary gear sets. A first interconnecting member is continuously interconnecting the second member of the first planetary gear set with the first member of the second planetary gear set. A second interconnecting member is continuously interconnecting the third member of the first planetary gear set with the second member of the second planetary gear set and with the first member of the third planetary gear set. Five torque transmitting mechanisms are each selectively engageable to interconnect at least one of the first, second and third members of the first, second and third planetary gear sets with at least one other of the first, second, third members and a stationary member. The torque transmitting mechanisms are selectively engageable in combinations of at least two to establish at least six forward speed ratios and at least one reverse speed ratio between the input member and the output member.

In another embodiment, a first of the five torque transmitting mechanisms is selectively engageable to interconnect the first member of the first planetary gear set with the second member of the third planetary gear set.

In yet another embodiment, a second of the five torque transmitting mechanisms is selectively engageable to interconnect the second member of the first planetary gear set and the first member of the second planetary gear set with the second member of the third planetary gear set.

In yet another embodiment, a third of the five torque transmitting mechanisms is selectively engageable to interconnect the third member of the first planetary gear set, the first member of the third planetary gear set, and the second member of the second planetary gear set with the stationary member.

In yet another embodiment, a fourth of the five torque transmitting mechanisms is selectively engageable to interconnect the third member of the second planetary gear set with the stationary member.

In yet another embodiment, a fifth of the five torque transmitting mechanisms is selectively engageable to interconnect the second member of the third planetary gear set with the stationary member.

In yet another embodiment, the first member of the first planetary gear set, the third member of the second planetary gear set and the first member of the third planetary gear set are sun gears, the second member of the first planetary gear set, the first member of the second planetary gear set, and the second member of the third planetary gear set are carrier members and the third member of the first planetary gear set, the second member of the second planetary gear set and the third member of the third planetary gear set are ring gears.

In yet another embodiment, the first member of the first planetary gear set, the third member of the second planetary gear set and the first member of the third planetary gear set are sun gears, the third member of the first planetary gear set, the second member of the second planetary gear set, and the second member of the third planetary gear set are carrier members and the second member of the first planetary gear set, the first member of the second planetary gear set and the third member of the third planetary gear set are ring gears.

In yet another embodiment, the first and second planetary gear sets are combined into a planetary gear assembly wherein the second member of the second planetary gear set and the first interconnecting member are integrated into the third member of the first planetary gear set and the first member of the second planetary gear set and a portion of the second interconnecting member are integrated into the second member of the first planetary gear set.

In yet another embodiment, the first member of the first planetary gear set, the third member of the second planetary gear set, and the first member of the third planetary gear set are sun gears, the first member of the second planetary gear set and the second member of the first planetary gear set are a carrier member, the second member of the third planetary gear set is a carrier member, the third member of the first planetary gear set and the second member of the second planetary gear set are a ring gear, and the third member of the third planetary gear set is a ring gear.

In yet another embodiment, the first member of the first planetary gear set, the third member of the second planetary gear set, and the first member of the third planetary gear set are sun gears, the second member of the second planetary gear set and the third member of the first planetary gear set are a carrier member, the second member of the third planetary gear set is a carrier member, the second member of the first planetary gear set and the first member of the second planetary gear set are a ring gear, and the third member of the third planetary gear set is a ring gear.

In yet another embodiment, the input member is continuously interconnected to the first member of the first planetary gear set.

In yet another embodiment, the output member is continuously interconnected to the third member of the third planetary gear set.

In yet another embodiment, the transmission includes an input member, an output member, a planetary gear set having first, second and third members, and a planetary gear assembly having first, second, third, and fourth members. An interconnecting member is continuously interconnecting the fourth member of the planetary gear assembly with the first member of the planetary gear set. A first torque transmitting mechanism is selectively engageable to interconnect the first member of the planetary gear assembly with the second member of the planetary gear set. A second torque transmitting mechanism is selectively engageable to interconnect the third member of the planetary gear assembly with the second member of the planetary gear set. A third torque transmitting mechanism is selectively engageable to interconnect the fourth member of the planetary gear assembly and the first member of the planetary gear set with a stationary member. A fourth torque transmitting mechanism is selectively engageable to interconnect the second member of the planetary gear assembly with the stationary member. A fifth torque transmitting mechanism is selectively engageable to interconnect the second member of the planetary gear set with the stationary member. The torque transmitting mechanisms are selectively engageable in combinations of at least two to establish at least six forward speed ratios and at least one reverse speed ratio between the input member and the output member.

Further features, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 9 is a truth table presenting the state of engagement of the various torque transmitting elements in each of the available forward and reverse speeds or gear ratios of the transmissions illustrated in FIGS. 1 through 8.

DETAILED DESCRIPTION

The following description is merely exemplary in nature and is not intended to limit the present disclosure, application, or uses.

At the outset, it should be appreciated that the embodiments of the six speed automatic transmission of the present invention have an arrangement of permanent mechanical connections between the elements of the three planetary gear sets. For example, a second component or element of a first planetary gear set is permanently coupled to a first component or element of the second planetary gear set. A third component or element of the first planetary gear set is permanently coupled to a second component or element of the second planetary gear set. A third component or element of the first planetary gear set is permanently coupled to a first component or element of the third planetary gear set.

Figure 1:
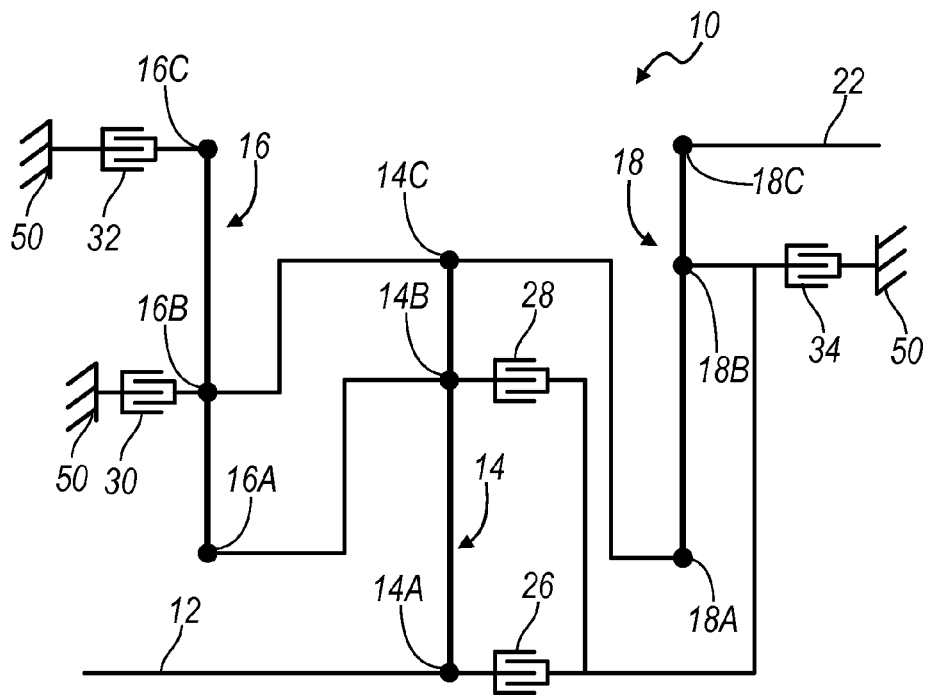
FIG. 1 is a lever diagram of an embodiment of a six speed transmission according to the present invention.

Referring now to FIG. 1, an embodiment of a six speed transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14 having three nodes: a first node 14A, a second node 14B and a third node 14C, a second planetary gear set 16 having three nodes: a first node 16A, a second node 16B and a third node 16C and a third planetary gear set 18 having three nodes: a first node 18A, a second node 18B and an output shaft or member 22.

The input member 12 is continuously coupled to the first node 14A of the first planetary gear set 14. The output member 22 is coupled to the third node 18C of the third planetary gear set 18. The second node 14B of the first planetary gear set 14 is coupled to the first node 16A of the second planetary gear set 16. The third node 14C of the first planetary gear set 14 is coupled to the second node 16B of the third planetary gear set 16. The third node 14C of the first planetary gear set 14 is also coupled to the first node 18A of the third planetary gear set 18.

A first clutch 26 selectively connects the first node 14A of the first planetary gear set 14 and the input member or shaft 12 with the second node 18B of the third planetary gear set 18. A second clutch 28 selectively connects the second node 14B of the first planetary gear set 14 and the first node 16A of the second planetary gear set 16 with the second node 18B of the third planetary gear set 18. A first brake 30 selectively connects the second node 16B of the second planetary gear set 16 with a stationary member or transmission housing 50. A second brake 32 selectively connects third node 16C of the second planetary gear set 16 with a stationary member or transmission housing 50. A third brake 34 selectively connects the second node 18B of the third planetary gear set 18 to a stationary member or transmission housing 50.

Figure 2:
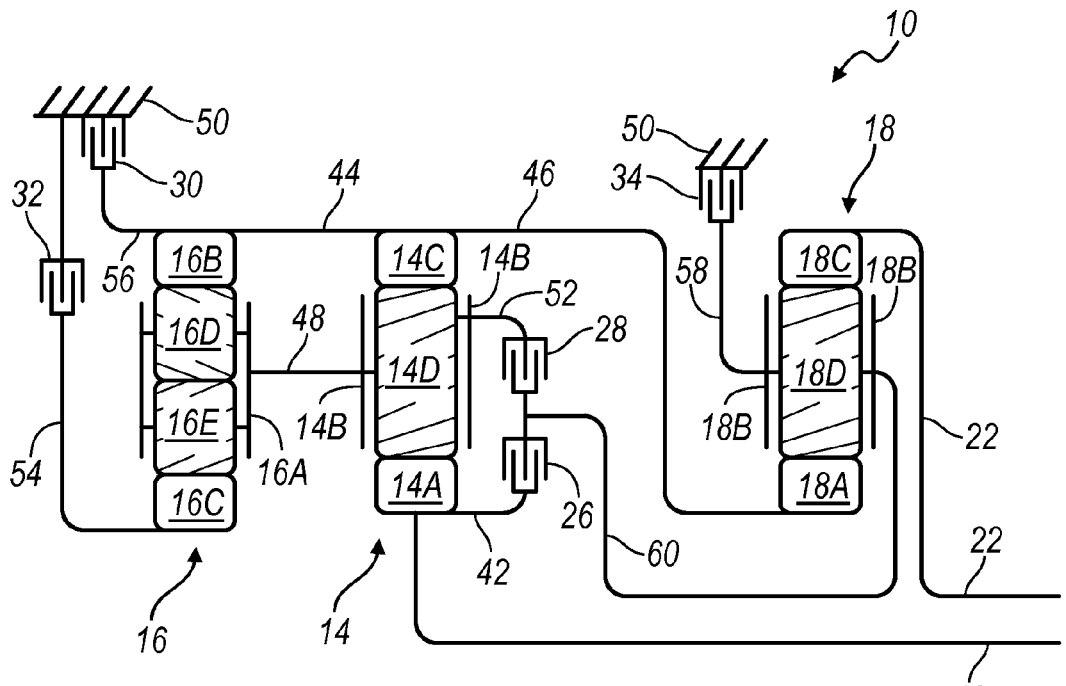
FIG. 2 is a diagrammatic illustration of an embodiment of a six speed transmission according to the present invention.

Referring now to FIG. 2, a stick diagram presents a schematic layout of the embodiment of the six speed transmission 10 according to the present invention. In FIG. 2, the numbering from the lever diagram of FIG. 1 is carried over. The clutches and couplings are correspondingly presented whereas the nodes of the planetary gear sets now appear as components of planetary gear sets such as sun gears, ring gears, planet gears and planet gear carriers.

For example, the planetary gear set 14 includes a sun gear member 14A, a ring gear member 14C and a planet gear carrier member 14B that rotatably supports a set of planet gears 14D (only one of which is shown). The sun gear member 14A is connected for common rotation with a first shaft or interconnecting member 42 and the input member or shaft 12. The ring gear member 14C is connected for common rotation with a second shaft or interconnecting member 44 and a third shaft or interconnecting member 46. The planet carrier member 14B is connected for common rotation with a fourth shaft or interconnecting member 48 and a fifth shaft or interconnecting member 52. The planet gears 14D are each configured to intermesh with both the sun gear member 14A and the ring gear member 14C.

The planetary gear set 16 includes a sun gear member 16C, a ring gear member 16B and a planet gear carrier member 16A that rotatably supports a first set of planet gears 16D (only one of which is shown) and a second set of planet gears 16E (only one of which is shown). The sun gear member 16C is connected for common rotation with the sixth shaft or interconnecting member 54. The ring gear member 16B is connected for common rotation with the second shaft or interconnecting member 44 and a seventh shaft or interconnecting member 56. The planet carrier member 16A is connected for common rotation with the fourth shaft or interconnecting member 48. The first set of planet gears 16D are each configured to intermesh with both the ring gear member 16B and second set of planet gears 16E. The second set of planet gears 16E are each configured to intermesh with both the sun gear member 16C and first set of planet gears 16D.

The planetary gear set 18 includes a sun gear member 18A, a ring gear member 18C and a planet gear carrier member 18B that rotatably supports a set of planet gears 18D (only one of which is shown). The sun gear member 18A is connected for common rotation with the third shaft or interconnecting member 46. The ring gear member 18C is connected for common rotation with output member or shaft 22. The planet carrier member 18B is connected for common rotation with the eighth shaft or interconnecting member 58 and a ninth shaft or interconnecting member 60. The planet gears 18D are each configured to intermesh with both the sun gear member 18A and the ring gear member 18C.

The input shaft or member 12 is continuously connected to an engine (not shown) or to a turbine of a torque converter (not shown). The output shaft or member 22 is continuously connected with the final drive unit or transfer case (not shown).

The torque-transmitting mechanisms or clutches 26, 28 and brakes 30, 32 and 34 allow for selective interconnection of the shafts or interconnecting members, members of the planetary gear sets and the housing. For example, the first clutch 26 is selectively engageable to connect the first shaft or interconnecting member 42 and the input shaft or member 12 with the ninth shaft or interconnecting member 60. The second clutch 28 is selectively engageable to connect the fifth shaft or interconnecting member 52 with the ninth shaft or interconnecting member 60. The first brake 30 is selectively engageable to connect the seventh shaft or interconnecting member 56 with a stationary element or the transmission housing 50 in order to restrict the member 56 from rotating relative to the transmission housing 50. The second brake 32 is selectively engageable to connect the sixth shaft or interconnecting member 54 with the stationary element or the transmission housing 50 in order to restrict the member 54 from rotating relative to the transmission housing 50. The third brake 34 is selectively engageable to connect the eighth shaft or interconnecting member 58 with the stationary element or the transmission housing 50 in order to restrict the member 58 from rotating relative to the transmission housing 50.

Figure 3:
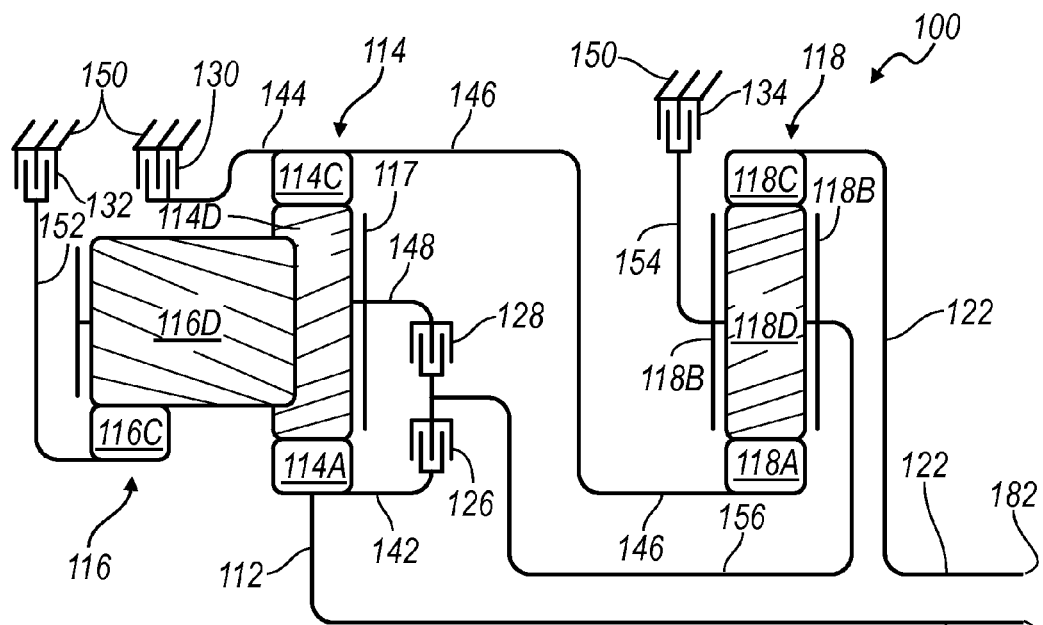
FIG. 3 is a diagrammatic illustration of another embodiment of a six speed transmission according to the present invention.

Referring now to FIG. 3, a schematic layout of another embodiment of the six speed transmission according to the present invention is illustrated and referenced as 100. In the present embodiment, the planetary gear sets 114 and 116 of transmission 100 share a common carrier member 117 that rotatably supports a first set of planet gears 114D (only one of which is shown) and a second set of planet gears 116D (only one of which is shown). Further, the planetary gear set 114 includes a sun gear member 114A and a ring gear member 114C and the planetary gear set 116 includes a sun gear member 116C. The sun gear member 114A is connected for common rotation with a first shaft or interconnecting member 142 and the input member or shaft 112. The ring gear member 114C is connected for common rotation with a second shaft or interconnecting member 144 and a third shaft or interconnecting member 146. The planet carrier member 117 is connected for common rotation with a fourth shaft or interconnecting member 148. The first set of planet gears 114D are each configured to intermesh with each of the sun gear member 114A, the ring gear member 114C and the second set of planet gears 116D. The second set of planet gears 116D are each configured as long pinions that intermesh with both the sun gear member 116C of planetary gear set 116 and the first set of planet gears 114D of planetary gear set 114. The sun gear member 116C is connected for common rotation with the fifth shaft or interconnecting member 152.

The planetary gear set 118 includes a sun gear member 118A, a ring gear member 118C and a planet gear carrier member 118B that rotatably supports a set of planet gears 118D (only one of which is shown). The sun gear member 118A is connected for common rotation with the third shaft or interconnecting member 146. The ring gear member 118C is connected for common rotation with output member or shaft 122. The planet carrier member 118B is connected for common rotation with the sixth shaft or interconnecting member 154 and a seventh shaft or interconnecting member 156. The planet gears 118D are each configured to intermesh with both the sun gear member 118A and the ring gear member 118C.

The input shaft or member 112 is continuously connected to an engine (not shown) or to a turbine of a torque converter (not shown). The output shaft or member 122 is continuously connected with the final drive unit or transfer case (not shown).

The torque-transmitting mechanisms or clutches 126, 128 and brakes 130, 132 and 134 allow for selective interconnection of the shafts or interconnecting members, members of the planetary gear sets and the housing. For example, the first clutch 126 is selectively engageable to connect the first shaft or interconnecting member 142 and the input shaft or member 112 with the sixth shaft or interconnecting member 154 and the seventh shaft or interconnecting member 156. The second clutch 128 is selectively engageable to connect the fourth shaft or interconnecting member 148 with the sixth shaft or interconnecting member 154 and the seventh shaft or interconnecting member 156. The first brake 130 is selectively engageable to connect the second shaft or interconnecting member 144 and third shaft or interconnecting member 146 with a stationary element or the transmission housing 150 in order to restrict the members 144, 146 from rotating relative to the transmission housing 150. The second brake 132 is selectively engageable to connect the fifth shaft or interconnecting member 152 with the stationary element or the transmission housing 150 in order to restrict the member 152 from rotating relative to the transmission housing 150. The third brake 134 is selectively engageable to connect the sixth shaft or interconnecting member 154 and the seventh shaft or interconnecting member 156 with the stationary element or the transmission housing 150 in order to restrict the members 154, 156 from rotating relative to the transmission housing 150.

Figure 4:
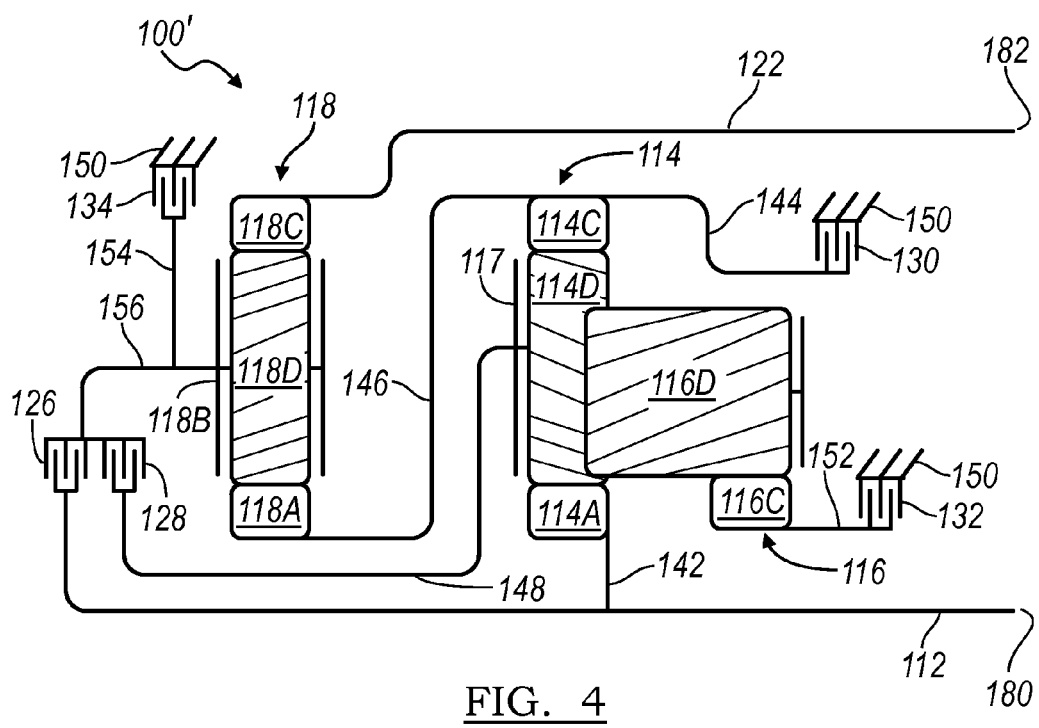
FIG. 4 is a diagrammatic illustration of yet another embodiment of a six speed transmission according to the present invention.

Referring now to FIG. 4, a transmission 100' is illustrated in schematic form. Transmission 100' has the same planetary gear sets 114, 116 and 118 and clutches 126, 128 and brakes 130, 132 and 134 as provided in transmission 100. However, the spacial arrangement of transmission 100' differs from spacial arrangement of transmission 100. More specifically, planetary gear sets 114, 116 of transmission 100' are adjacent the ends 180 and 182 of the input and output shafts 112, 122. In contrast, planetary gear set 118 in transmission 100 is disposed between planetary gear sets 114, 116 and the ends 180 and 182 of the input and output shafts 112, 122 of transmission 100.

Figure 5:
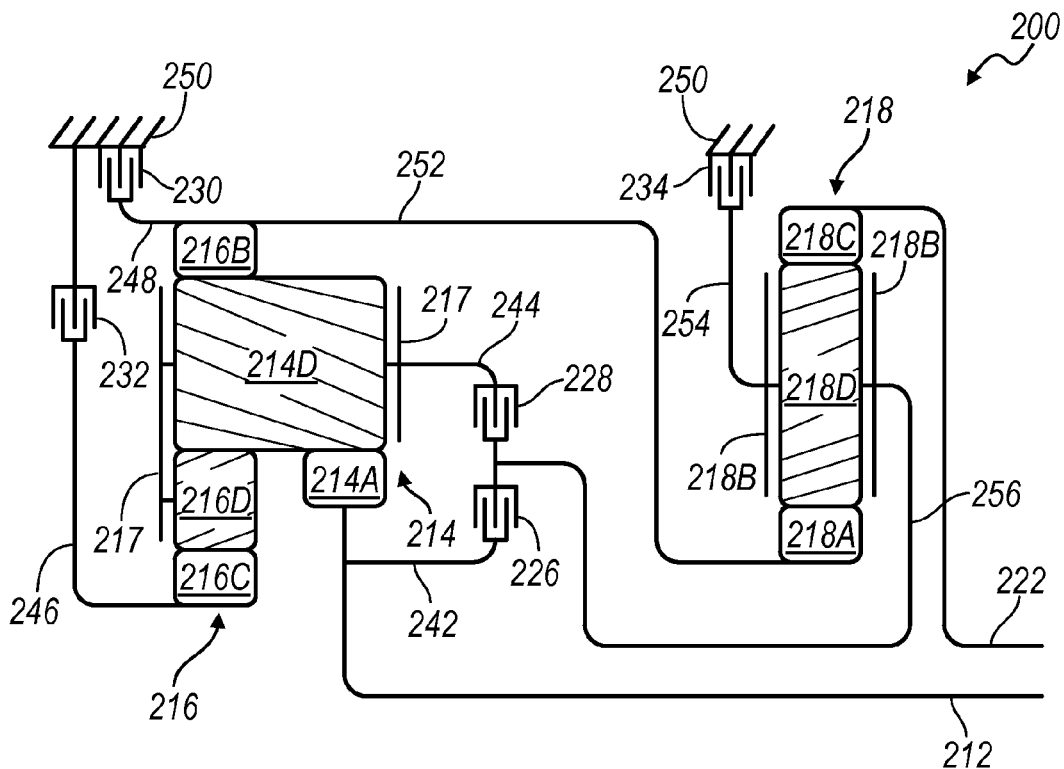
FIG. 5 is a diagrammatic illustration of yet another embodiment of a six speed transmission according to the present invention.

Referring now to FIG. 5, a schematic layout of another embodiment of the six speed transmission according to the present invention is illustrated and referenced as 200. In the present embodiment, the planetary gear sets 214 and 216 of transmission 200 share a common carrier member 217 that rotatably supports a first set of planet gears 214D (only one of which is shown) and a second set of planet gears 216D (only one of which is shown). Further, the planetary gear set 214 includes a sun gear member 214A and the planetary gear set 216 includes a sun gear member 216C and a ring gear member 216B. The sun gear member 214A is connected for common rotation with a first shaft or interconnecting member 242 and the input member or shaft 212. The planet carrier member 217 is connected for common rotation with a second shaft or interconnecting member 244. The first set of planet gears 214D are each configured as long pinion gears that intermesh with each of the sun gear member 214A, the ring gear member 216B and the second set of planet gears 216D. The second set of planet gears 216D are each configured intermesh with both the sun gear member 216C of planetary gear set 216 and the first set of planet gears 214D of planetary gear set 214. The sun gear member 216C is connected for common rotation with a third shaft or interconnecting member 246. The ring gear member 216B is connected for common rotation with a fourth shaft or interconnecting member 248 and a fifth shaft or interconnecting member 252.

The planetary gear set 218 includes a sun gear member 218A, a ring gear member 218C and a planet gear carrier member 218B that rotatably supports a set of planet gears 218D (only one of which is shown). The sun gear member 218A is connected for common rotation with the fifth shaft or interconnecting member 252. The ring gear member 218C is connected for common rotation with output member or shaft 222. The planet carrier member 218B is connected for common rotation with the sixth shaft or interconnecting member 254 and a seventh shaft or interconnecting member 256. The planet gears 218D are each configured to intermesh with both the sun gear member 218A and the ring gear member 218C.

The input shaft or member 212 is continuously connected to an engine (not shown) or to a turbine of a torque converter (not shown). The output shaft or member 222 is continuously connected with the final drive unit or transfer case (not shown).

The torque-transmitting mechanisms or clutches 226, 228 and brakes 230, 232 and 234 allow for selective interconnection of the shafts or interconnecting members, members of the planetary gear sets and the housing. For example, the first clutch 226 is selectively engageable to connect the first shaft or interconnecting member 242 and the input shaft or member 212 with the sixth shaft or interconnecting member 254 and the seventh shaft or interconnecting member 256. The second clutch 228 is selectively engageable to connect the second shaft or interconnecting member 244 with the sixth shaft or interconnecting member 254 and the seventh shaft or interconnecting member 256. The first brake 230 is selectively engageable to connect the fourth shaft or interconnecting member 248 and fifth shaft or interconnecting member 252 with a stationary element or the transmission housing 250 in order to restrict the members 248, 252 from rotating relative to the transmission housing 250. The second brake 232 is selectively engageable to connect the third shaft or interconnecting member 246 with the stationary element or the transmission housing 250 in order to restrict the member 246 from rotating relative to the transmission housing 250. The third brake 234 is selectively engageable to connect the sixth shaft or interconnecting member 254 and the seventh shaft or interconnecting member 256 with the stationary element or the transmission housing 250 in order to restrict the members 254, 256 from rotating relative to the transmission housing 250.

Figure 6:
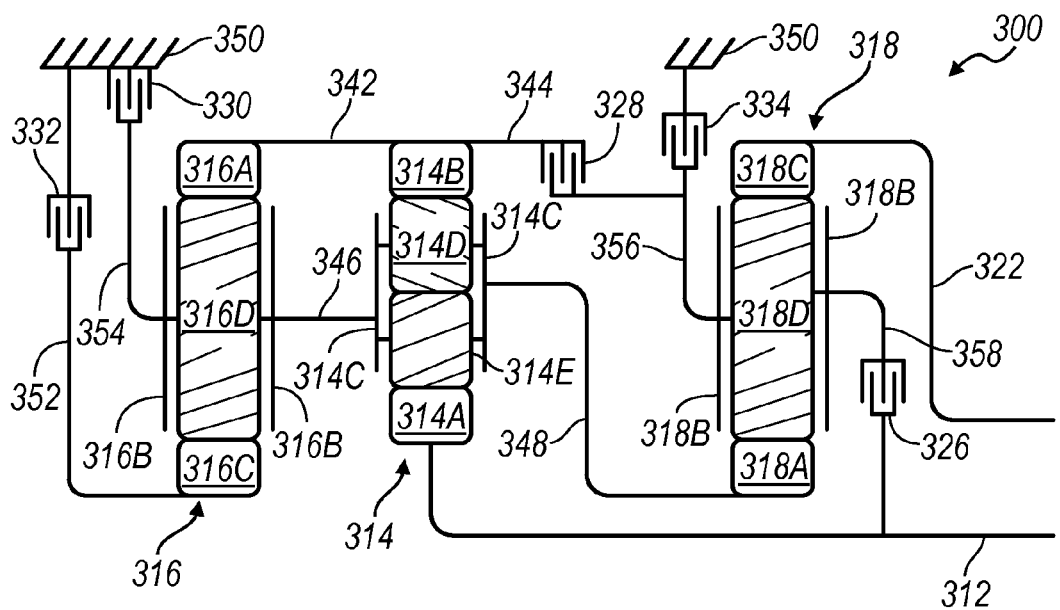
FIG. 6 is a diagrammatic illustration of yet another embodiment of a six speed transmission according to the present invention.

Referring now to FIG. 6, a schematic layout of another embodiment of the six speed transmission according to the present invention is illustrated and referenced as 300. In the present embodiment, the planetary gear set 314 includes a sun gear member 314A, a ring gear member 314B and a planet gear carrier member 314C that rotatably supports a first set of planet gears 314D (only one of which is shown) and a second set of planet gears 314E (only one of which is shown). The sun gear member 314A is connected for common rotation with an input shaft or interconnecting member 312. The ring gear member 314B is connected for common rotation with the first shaft or interconnecting member 342 and a second shaft or interconnecting member 344. The planet carrier member 314C is connected for common rotation with a third shaft or interconnecting member 346 and a fourth shaft or interconnecting member 348. The first set of planet gears 314D are each configured to intermesh with both the ring gear member 314B and second set of planet gears 314E. The second set of planet gears 314E are each configured to intermesh with both the sun gear member 314A and first set of planet gears 314D.

The planetary gear set 316 includes a sun gear member 316C, a ring gear member 316A and a planet gear carrier member 316B that rotatably supports a set of planet gears 316D (only one of which is shown). The sun gear member 316C is connected for common rotation with a fifth shaft or interconnecting member 352. The ring gear member 316A is connected for common rotation with the first shaft or interconnecting member 342. The planet carrier member 316B is connected for common rotation with the third shaft or interconnecting member 346 and a sixth shaft or interconnecting member 354. The planet gears 316D are each configured to intermesh with both the sun gear member 316C and the ring gear member 316A.

The planetary gear set 318 includes a sun gear member 318A, a ring gear member 318C and a planet gear carrier member 318B that rotatably supports a set of planet gears 318D (only one of which is shown). The sun gear member 318A is connected for common rotation with the fourth shaft or interconnecting member 348. The ring gear member 318C is connected for common rotation with output member or shaft 322. The planet carrier member 318B is connected for common rotation with a seventh shaft or interconnecting member 356 and an eighth shaft or interconnecting member 358. The planet gears 318D are each configured to intermesh with both the sun gear member 318A and the ring gear member 318C.

The input shaft or member 312 is continuously connected to an engine (not shown) or to a turbine of a torque converter (not shown). The output shaft or member 322 is continuously connected with the final drive unit or transfer case (not shown).

The torque-transmitting mechanisms or clutches 326, 328 and brakes 330, 332 and 334 allow for selective interconnection of the shafts or interconnecting members, members of the planetary gear sets and the housing. For example, the first clutch 326 is selectively engageable to connect the input shaft or member 312 with the eighth shaft or interconnecting member 358. The second clutch 328 is selectively engageable to connect the second shaft or interconnecting member 344 with the seventh shaft or interconnecting member 356. The first brake 330 is selectively engageable to connect the sixth shaft or interconnecting member 354 with a stationary element or the transmission housing 350 in order to restrict the member 354 from rotating relative to the transmission housing 350. The second brake 332 is selectively engageable to connect the fifth shaft or interconnecting member 352 with the stationary element or the transmission housing 350 in order to restrict the member 352 from rotating relative to the transmission housing 350. The third brake 334 is selectively engageable to connect the seventh shaft or interconnecting member 356 with the stationary element or the transmission housing 350 in order to restrict the member 356 from rotating relative to the transmission housing 350.

Figure 7:
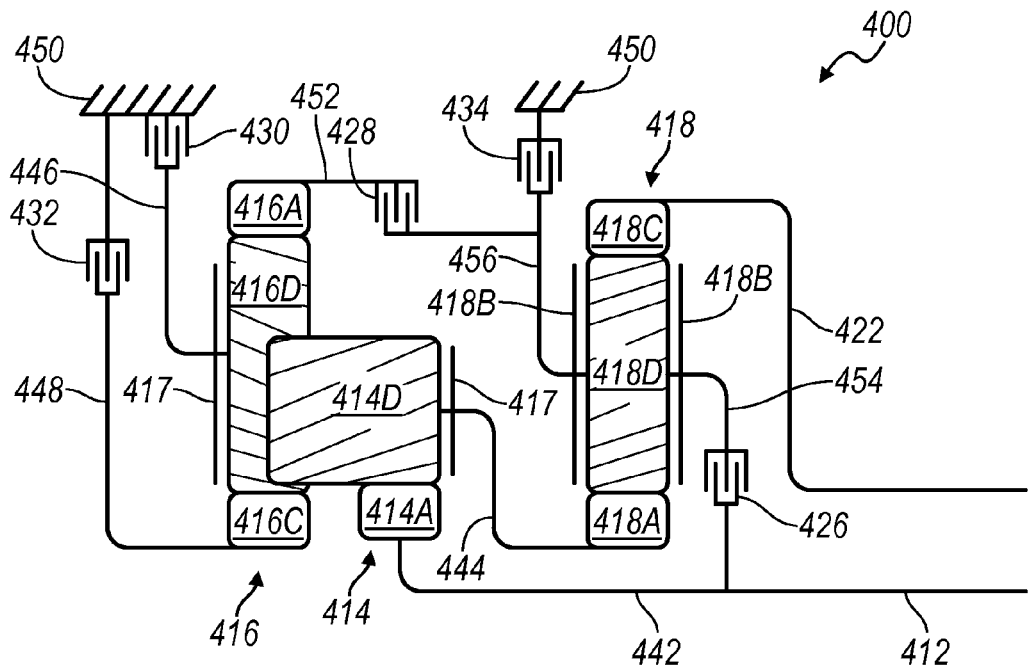
FIG. 7 is a diagrammatic illustration of still another embodiment of a six speed transmission according to the present invention.

Referring now to FIG. 7, a schematic layout of another embodiment of the six speed transmission according to the present invention is illustrated and referenced as 400. In the present embodiment, the planetary gear sets 414 and 416 of transmission 400 share a common carrier member 417 that rotatably supports a first set of planet gears 414D (only one of which is shown) and a second set of planet gears 416D (only one of which is shown). Further, the planetary gear set 414 includes a sun gear member 414A and the planetary gear set 416 includes a sun gear member 416C and a ring gear member 416A. The sun gear member 414A is connected for common rotation with a first shaft or interconnecting member 442 and the input member or shaft 412. The planet carrier member 417 is connected for common rotation with a second shaft or interconnecting member 444 and to a third shaft or interconnecting member 446. The first set of planet gears 414D are each configured as long pinion gears that intermesh with both the sun gear member 414A and the second set of planet gears 416D. The second set of planet gears 416D are each configured intermesh with both the sun gear member 416C of planetary gear set 416, ring gear member 416A and the first set of planet gears 414D of planetary gear set 414. The sun gear member 416C is connected for common rotation with a fourth shaft or interconnecting member 448. The ring gear member 416A is connected for common rotation with a fifth shaft or interconnecting member 452.

The planetary gear set 418 includes a sun gear member 418A, a ring gear member 418C and a planet gear carrier member 418B that rotatably supports a set of planet gears 418D (only one of which is shown). The sun gear member 418A is connected for common rotation with the second shaft or interconnecting member 444. The ring gear member 418C is connected for common rotation with output member or shaft 422. The planet carrier member 418B is connected for common rotation with the sixth shaft or interconnecting member 454 and a seventh shaft or interconnecting member 456. The planet gears 418D are each configured to intermesh with both the sun gear member 418A and the ring gear member 418C.

The input shaft or member 412 is continuously connected to an engine (not shown) or to a turbine of a torque converter (not shown). The output shaft or member 422 is continuously connected with the final drive unit or transfer case (not shown).

The torque-transmitting mechanisms or clutches 426, 428 and brakes 430, 432 and 434 allow for selective interconnection of the shafts or interconnecting members, members of the planetary gear sets and the housing. For example, the first clutch 426 is selectively engageable to connect the first shaft or interconnecting member 442 and the input shaft or member 412 with the sixth shaft or interconnecting member 454 and the seventh shaft or interconnecting member 456. The second clutch 428 is selectively engageable to connect the fifth shaft or interconnecting member 452 with the seventh shaft or interconnecting member 456. The first brake 430 is selectively engageable to connect second shaft or interconnecting member 444 and the third shaft or interconnecting member 446 with a stationary element or the transmission housing 450 in order to restrict the members 444, 446 from rotating relative to the transmission housing 450. The second brake 432 is selectively engageable to connect the fourth shaft or interconnecting member 448 with the stationary element or the transmission housing 450 in order to restrict the member 448 from rotating relative to the transmission housing 450. The third brake 434 is selectively engageable to connect the sixth shaft or interconnecting member 454 and the seventh shaft or interconnecting member 456 with the stationary element or the transmission housing 450 in order to restrict the members 454, 456 from rotating relative to the transmission housing 450.

Figure 8:
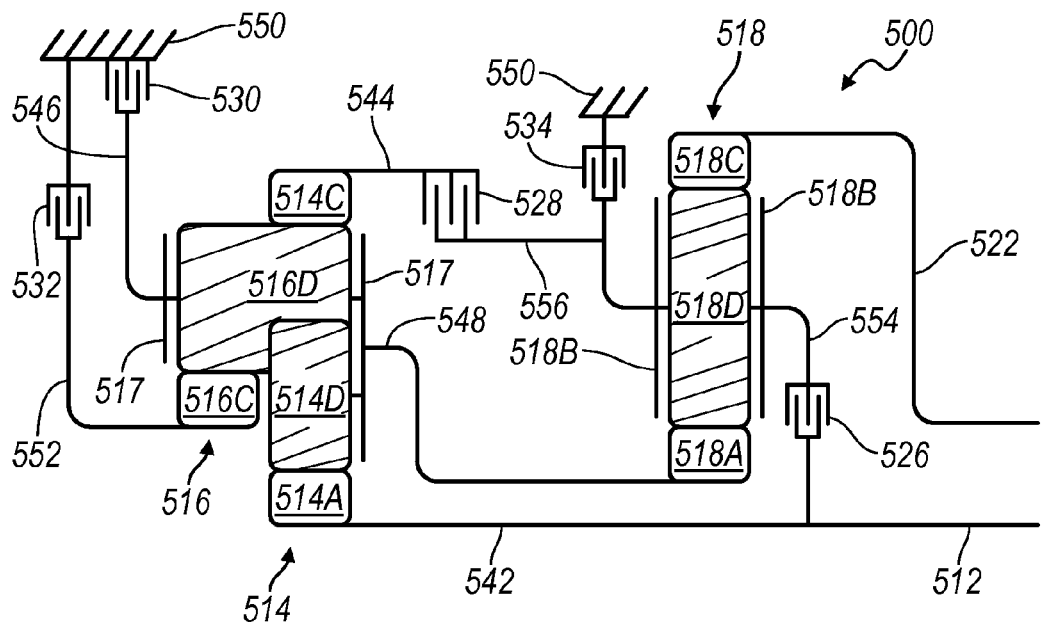
FIG. 8 is a diagrammatic illustration of still another embodiment of a six speed transmission according to the present invention.

Referring now to FIG. 8, a schematic layout of another embodiment of the six speed transmission according to the present invention is illustrated and referenced as 500. In the present embodiment, the planetary gear sets 514 and 516 of transmission 500 share a common carrier member 517 that rotatably supports a first set of planet gears 514D (only one of which is shown) and a second set of planet gears 516D (only one of which is shown). Further, the planetary gear set 514 includes a sun gear member 514A and a ring gear member 514C and the planetary gear set 516 includes a sun gear member 516C. The sun gear member 514A is connected for common rotation with a first shaft or interconnecting member 542 and the input member or shaft 512. The ring gear member 514C is connected for common rotation with a second shaft or interconnecting member 544. The planet carrier member 517 is connected for common rotation with a third shaft or interconnecting member 546 and a fourth shaft or interconnecting member 548. The first set of planet gears 514D are each configured to intermesh with both the sun gear member 514A and the second set of planet gears 516D. The second set of planet gears 516D are each configured as long pinions that intermesh with each of the sun gear member 516C of planetary gear set 516, the ring gear member 514C and the first set of planet gears 514D of planetary gear set 514. The sun gear member 516C is connected for common rotation with the fifth shaft or interconnecting member 552.

The planetary gear set 518 includes a sun gear member 518A, a ring gear member 518C and a planet gear carrier member 518B that rotatably supports a set of planet gears 518D (only one of which is shown). The sun gear member 518A is connected for common rotation with the fourth shaft or interconnecting member 548. The ring gear member 518C is connected for common rotation with output member or shaft 522. The planet carrier member 518B is connected for common rotation with the sixth shaft or interconnecting member 554 and a seventh shaft or interconnecting member 556. The planet gears 518D are each configured to intermesh with both the sun gear member 518A and the ring gear member 518C.

The input shaft or member 512 is continuously connected to an engine (not shown) or to a turbine of a torque converter (not shown). The output shaft or member 522 is continuously connected with the final drive unit or transfer case (not shown).

The torque-transmitting mechanisms or clutches 526, 528 and brakes 530, 532 and 534 allow for selective interconnection of the shafts or interconnecting members, members of the planetary gear sets and the housing. For example, the first clutch 526 is selectively engageable to connect the first shaft or interconnecting member 542 and the input shaft or member 512 with the sixth shaft or interconnecting member 554 and the seventh shaft or interconnecting member 556. The second clutch 528 is selectively engageable to connect the second shaft or interconnecting member 544 with the sixth shaft or interconnecting member 554 and the seventh shaft or interconnecting member 556. The first brake 530 is selectively engageable to connect the third shaft or interconnecting member 546 and fourth shaft or interconnecting member 548 with a stationary element or the transmission housing 550 in order to restrict the members 546, 548 from rotating relative to the transmission housing 550. The second brake 532 is selectively engageable to connect the fifth shaft or interconnecting member 552 with the stationary element or the transmission housing 550 in order to restrict the member 552 from rotating relative to the transmission housing 550. The third brake 534 is selectively engageable to connect the sixth shaft or interconnecting member 554 and the seventh shaft or interconnecting member 556 with the stationary element or the transmission housing 550 in order to restrict the members 554, 556 from rotating relative to the transmission housing 550.

Referring now to FIG. 2 through FIG. 9, the operation of the embodiments of the six speed transmission of the present invention will be described. It will be appreciated that transmissions 10, 100, 100', 200, 300, 400 and 500 are capable of transmitting torque from the input shaft or member to the output shaft or member in at least six forward speed or torque ratios and at least one reverse speed or torque ratio with triple overdrive. Each forward and reverse speed or torque ratio is attained by engagement of one or more of the torque-transmitting mechanisms, as will be explained below. FIG. 9 is a truth table presenting the various combinations of torque-transmitting mechanisms that are activated or engaged to achieve the various gear states. An "X" in the box means that the particular clutch or brake is engaged to achieve the desired gear state. An "O" represents that the particular torque transmitting device (i.e. a brake or clutch) is on or active, but not carrying torque. Actual numerical gear ratios of the various gear states are also presented although it should be appreciated that these numerical values are exemplary only and that they may be adjusted over significant ranges to accommodate various applications and operational criteria of the transmissions of the present invention. Examples of the gear ratios that may be obtained using the embodiments of the present invention are also shown in FIG. 9. Of course, other gear ratios are achievable depending on the gear diameter, gear teeth count and gear configuration selected.

For example, to establish a reverse gear, the second brake (i.e. 32, 132, 232, 332, 432, and 532) and third brake (i.e. 34, 134, 234, 334, 434, and 534) are engaged or activated. Brakes (32, 132, 232, 332, 432, and 532) and (34, 134, 234, 334, 434, and 534) connect various interconnecting members and members of the planetary gear sets to the transmission housing, as described above with respect to the embodiments of the present invention. Likewise, the six forward ratios are achieved through different combinations of clutch and brake engagement, as shown in FIG. 9.

It will be appreciated that the foregoing explanation of operation and gear states of the six speed transmissions 10, 100, 100', 200, 300, 400 and 500 assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

The transmission of the present invention has many advantages and benefits over the prior art, for example, the present invention contemplates that transmissions disclosed above may be configured for both front wheel and rear wheel drive vehicles.

The description of the invention is merely exemplary in nature and variations that do not depart from the gist of the invention are intended to be within the scope of the invention. Such variations are not to be regarded as a departure from the spirit and scope of the invention.

The following is claimed:

1. A transmission comprising:
   an input member;
   an output member;
   first, second and third planetary gear sets each having a sun gear, a carrier member, and a ring gear, wherein the input and output members are each interconnected to at least one of the first, second, and third planetary gear sets;
   a first interconnecting member continuously interconnecting the carrier member of the first planetary gear set with the carrier member of the second planetary gear set;
   a second interconnecting member continuously interconnecting the ring gear of the first planetary gear set with the ring gear of the second planetary gear set and with the sun gear of the third planetary gear set; and
   five torque transmitting mechanisms each selectively engageable to interconnect at least one of the sun gears, carrier members, and ring gears of the first, second and third planetary gear sets with at least one other of the sun gears, carrier members, and ring gears and a stationary member, and
   wherein the torque transmitting mechanisms are selectively engageable in combinations of at least two to establish at least six forward speed ratios and at least one reverse speed ratio between the input member and the output member.

2. The transmission of claim 1 wherein a first of the five torque transmitting mechanisms is selectively engageable to interconnect the sun gear of the first planetary gear set with the carrier member of the third planetary gear set.

3. The transmission of claim 2 wherein a second of the five torque transmitting mechanisms is selectively engageable to interconnect the carrier member of the first planetary gear set and the carrier member of the second planetary gear set with the carrier member of the third planetary gear set.

4. The transmission of claim 3 wherein a third of the five torque transmitting mechanisms is selectively engageable to interconnect the ring gear of the first planetary gear set, the sun gear of the third planetary gear set, and the ring gear of the second planetary gear set with the stationary member.

5. The transmission of claim 4 wherein a fourth of the five torque transmitting mechanisms is selectively engageable to interconnect the sun gear of the second planetary gear set with the stationary member.

6. The transmission of claim 5 wherein a fifth of the five torque transmitting mechanisms is selectively engageable to interconnect the carrier member of the third planetary gear set with the stationary member.

7. The transmission of claim 1 wherein the input member is continuously interconnected to the sun gear of the first planetary gear set.

8. The transmission of claim 1 wherein the output member is continuously interconnected to the ring gear of the third planetary gear set.

9. A transmission comprising:
   an input member;
   an output member;
   first, second and third planetary gear sets each having a sun gear, a carrier member, and a ring gear, wherein the input and output members are each interconnected to at least one of the first, second, and third planetary gear sets;
   two interconnecting members each connecting at least one of the sun gears, carrier members, and ring gears of the first, second and third planetary gear sets with at least another one of the sun gears, carrier members, and ring gears and a stationary member, and
   a first torque transmitting mechanism selectively engageable to interconnect the sun gear of the first planetary gear set with the carrier member of the third planetary gear set;
   a second torque transmitting mechanism selectively engageable to interconnect the carrier member of the first planetary gear set and the carrier member of the second planetary gear set with the carrier member of the third planetary gear set;
   a third torque transmitting mechanism selectively engageable to interconnect the ring gear of the first planetary gear set, the sun gear of the third planetary gear set, and the ring gear of the second planetary gear set with the stationary member;
   a fourth torque transmitting mechanism selectively engageable to interconnect the sun gear of the second planetary gear set with the stationary member; and
   a fifth torque transmitting mechanisms is selectively engageable to interconnect the carrier member of the third planetary gear set with the stationary member, and
   wherein the torque transmitting mechanisms are selectively engageable in combinations of at least two to establish at least six forward speed ratios and at least one reverse speed ratio between the input member and the output member.

10. The transmission of claim 9 wherein a first of the two interconnecting members continuously interconnect the carrier member of the first planetary gear set with the carrier member of the second planetary gear set.

11. The transmission of claim 10 wherein a second of the two interconnecting members continuously interconnects the ring gear of the first planetary gear set, the ring gear of the second planetary gear set, and the sun gear of the third planetary gear set.

* * * * *